(12) United States Patent
Yehezkely et al.

(10) Patent No.: US 12,015,341 B2
(45) Date of Patent: Jun. 18, 2024

(54) OSCILLATOR VOLTAGE REFERENCE METHOD AND APPARATUS

(71) Applicant: Wiliot, Ltd., Caesarea (IL)

(72) Inventors: Alon Yehezkely, Haifa (IL); Ido Yogev, Pardes-Hana Karkur (IL); Tom Cohen, Haifa (IL)

(73) Assignee: WILIOT, LTD., Caesarea (IL)

( * ) Notice: Subject to any disclaimer, the term of this patent is extended or adjusted under 35 U.S.C. 154(b) by 249 days.

(21) Appl. No.: 17/658,718

(22) Filed: Apr. 11, 2022

(65) Prior Publication Data

US 2022/0329153 A1 Oct. 13, 2022

Related U.S. Application Data

(60) Provisional application No. 63/173,683, filed on Apr. 12, 2021.

(51) Int. Cl.
*H02M 3/155* (2006.01)
*G06K 19/07* (2006.01)
*H02J 50/00* (2016.01)

(52) U.S. Cl.
CPC ........ *H02M 3/155* (2013.01); *G06K 19/0709* (2013.01); *H02J 50/001* (2020.01)

(58) Field of Classification Search
CPC ... H02M 3/155; H02J 50/001; G06K 19/0709
See application file for complete search history.

(56) References Cited

U.S. PATENT DOCUMENTS

| | | | |
|---|---|---|---|
| 11,722,139 B2* | 8/2023 | Chen | H03L 7/02 331/1 R |
| 2016/0105098 A1* | 4/2016 | Savulak | H02J 7/345 323/234 |
| 2020/0218955 A1* | 7/2020 | Kupferman | H03F 3/245 |
| 2022/0239310 A1* | 7/2022 | Lim | H03M 1/468 |

* cited by examiner

*Primary Examiner* — Jue Zhang
*Assistant Examiner* — Lakaisha Jackson
(74) *Attorney, Agent, or Firm* — M&B IP Analysts, LLC (57) ABSTRACT

Apparatus providing a regulated power supply to an oscillator comprises a reference voltage generator supplying a voltage reference, a regulator producing, based on a voltage received thereat, a regulated supply used by the oscillator which bases its frequency thereon, a capacitor having a terminal coupled to the regulator at a point, and a switch that is coupled to the reference voltage generator and to the point, wherein the closed switch couples the reference voltage generator to the point and wherein the open switch disconnects the point from the reference voltage generator, the switch being closed for a first time period during which a voltage based on the voltage reference from the reference voltage generator is supplied to the regulator and capacitor, and for a second, subsequent, time period the switch is opened and voltage stored on the capacitor is supplied to the regulator.

20 Claims, 6 Drawing Sheets

OSCILLATOR VOLTAGE REFERENCE METHOD AND APPARATUS

This application claims priority from U.S. Provisional Patent Application 63/173,683 filed on Apr. 12, 2021, the contents of which are incorporated by reference.

TECHNICAL FIELD

The present disclosure generally related to wireless Interest of things (IoT) devices, and more particularly to power harvesting devices.

BACKGROUND

The Internet of Things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that goes beyond Machine-to-Machine (M2M) communications and covers a variety of protocols, domains, and applications.

IoT can be incorporated into a wide variety of devices, such as heart monitoring implants, biochip transponders, e.g., on farm animals, automobiles, e.g., with built-in sensors, automation of lighting, heating, ventilation, and air conditioning (HVAC) systems, and appliances, such as washer/dryers, robotic vacuums, air purifiers, ovens or refrigerators/freezers, that use wireless communication, e.g., Wi-Fi, for remote monitoring. Typically, IoT devices contain wireless sensors or a network of such sensors.

Most IoT devices are wireless devices that collect data and transmit the collected data to a central controller. There are a few requirements to enable widespread deployment of IoT devices. Such requirements include reliable communication links, low energy consumption, and low maintenance costs.

To this end, IoT devices and wireless sensors are designed to support low power communication protocols, such as Bluetooth low energy (BLE), LoRa, and the like. However, IoT devices utilizing such protocols often require a battery, e.g., a coin battery. The reliance on a power source, e.g., a battery, is a limiting factor for electronic devices, due to, for example, cost, size, lack of durability with regard to environmental effects, and the need to frequent replacement the battery.

Of course, all electronic devices require a power source to operate. Even devices, such as low-power Internet of Things (IoT) devices, that are designed to support low power communication protocols typically operate using a battery, e.g., a coin-shaped battery. As an alternative to batteries, power supply may be harvested from other sources, such as light, mechanical movement, and electromagnetic power, e.g., existing radio frequency transmissions. The harvested power is stored in a rechargeable battery.

An alternative to using batteries, a self-sufficient or self-sustainable power supply that may harvest energy from sources such as light, heat, activity, piezoelectric, and electromagnetic energy can be incorporated into IoT devices. Use of electromagnetic energy that includes radio frequency (RF) is promising due to its relatively unrestricted spatial freedom and abundance. An energy harvester as such often includes, but is not limited to, an antenna, a rectifier circuit, a capacitor or rechargeable battery for energy storage, and a power management unit to distribute and manage power as needed.

Since the energy of the system is dependent on the energy harvester, it is a desire to have a maximum harvesting range from the ambient power source, i.e., maximal harvesting sensitivity. Also, fast charging, e.g., 10 seconds, for better response time and higher packet rates, e.g., for mobile device gateway, is another desire. One challenge to designing a system to satisfy these needs is that each such a system may require different harvester design optimization point.

In a capacitor, the charge time is linear to the capacitor size. That is, smaller the capacitor, shorter the time it takes to charge to a certain voltage. Hence, for this reason, it may be desirable to limit the capacitor size so as to achieve faster charging. When the capacitor is used to power circuits using the energy stored therein, the voltage stored in the capacitor drops as energy is drained from the capacitor. In the case of a smaller capacitor, a larger voltage drop occurs for the smaller capacitor while powering circuit operation than would occur for a larger capacitor in the same time.

Normally, in order to prevent performance degradation of supply-voltage-sensitive functions, such as oscillators, special designs and techniques such as, but not limited to, a voltage regulator or a phase-locked loop (PLL), are utilized.

A voltage regulator regulates the supply it provides as an output based on and accurate voltage reference. However, the voltage reference is dependent on the supply voltage and it is also susceptible supply transients.

A PLL regulates oscillator frequencies through use of an accurate reference oscillator that has low supply sensitivity, e.g., a crystal-based oscillator. However, use of such a reference, which is external to the chip that employs it as a reference, is relatively high in cost and such use limits the form factor of the overall device. Furthermore, a PLL is power-hungry in that it has a high power consumption to function.

In using RF for communication, e.g., BLE, time limitations exist due to the following functions required for RF communication: over-the-air frequency calibration based on BLE advertisement packets and transmission right after Clear Channel Assessment (CCA). This time limitation results in there being a circuit power constraint. Furthermore, the voltage reference used for the voltage regulators in the circuit are required to have stabilized within this limited time frame and to remain stable during the complete operation window. This brings challenges in designing a voltage reference that has fast stabilization, low sensitivity to supply variation, low thermal noise, and consumes only a small amount of power and area. In addition, problems of reference settling marginality impacting repetition of base frequency value and frequency drifting with supply may occur.

In view of the above discussion, there is a need to provide a system that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include apparatus for providing a regulated power supply to an oscillator. The apparatus comprises: a reference voltage generator, the reference voltage generator supplying a voltage reference as an output; a regulator that produces a regulated supply as a function of a voltage received as an input thereto, the regulated supply being provided as an output for use by the oscillator which bases a frequency it produces and supplies as an output on the regulated supply; a capacitor having a terminal thereof coupled to the regulator; and a controllable switch, the controllable switch being coupled to the reference voltage generator and being coupled to a point at which the capacitor terminal is coupled to the regulator, wherein when the controllable switch is in a closed position the controllable switch electrically couples the reference voltage generator to the regulator and to the capacitor terminal so that the regulator and capacitor each receive the voltage reference supplied as an output by the reference voltage generator and when the controllable switch is in an open position the regulator and capacitor are both disconnected from the reference voltage generator; wherein, the controllable switch is closed for at least one time period, wherein during the at least one time period a voltage is stored on the capacitor, the voltage stored on the capacitor being based on the voltage reference supplied as an output by the reference voltage generator, and for at least a second time period that is subsequent to the first time period the controllable switch is in the open position, and voltage stored on the capacitor is supplied from the capacitor terminal to the regulator for use as the voltage received as an input thereto.

Some embodiments disclosed herein include a method for use in a system for providing a regulated power supply to an oscillator of a wireless tag, the wireless tag comprising: a reference voltage generator, the reference voltage generator supplying a voltage reference as an output; a regulator that produces a regulated supply as a function of a voltage received as an input thereto, the regulated supply being provided as an output for use by the oscillator which bases a frequency it produces and supplies as an output on the regulated supply; a sample capacitor having a terminal thereof coupled to the regulator; and a controllable switch, the controllable switch being coupled to the reference voltage generator and being coupled to a point at which the sample capacitor terminal is coupled to the regulator, wherein when the controllable switch is in a closed position the controllable switch electrically couples the reference voltage generator to the regulator and to the sample capacitor terminal so that the regulator and sample capacitor each receive the voltage reference supplied as an output by the reference voltage generator and when the controllable switch is in an open position the regulator and sample capacitor are both disconnected from the reference voltage generator; and the method comprising: powering on the reference generator; powering on load circuitry, the load circuitry being circuitry whose operation is dependent as a function of the voltage reference; storing a voltage having substantially the same voltage value as the reference voltage on the sample capacitor by closing the controllable switch; and opening the controllable switch, whereby the point at which the sample capacitor terminal is coupled to the regulator is disconnected from the reference voltage generator.

DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In the description, identically numbered components within different ones of the FIGs. refer to components that are substantially the same.

Figure 1:
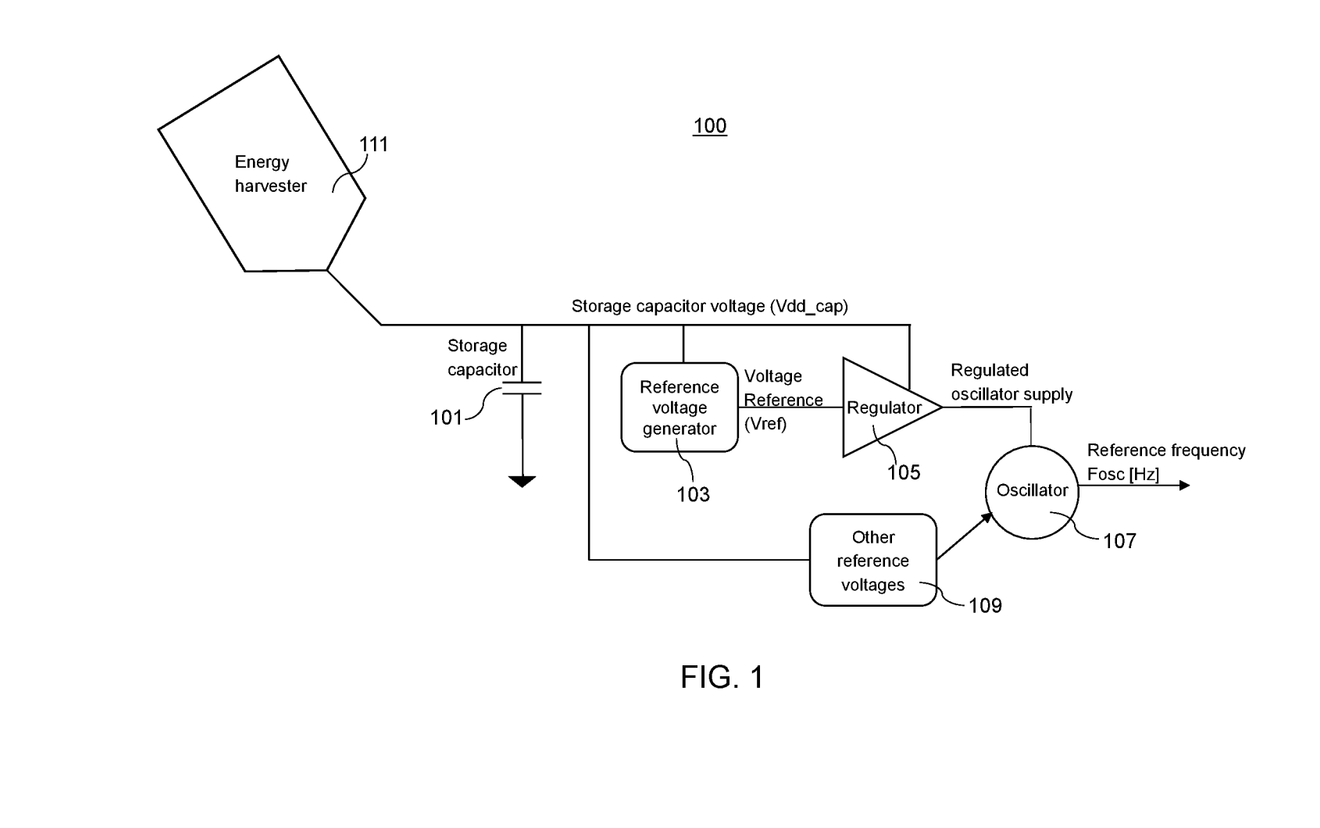
FIG. 1 shows an illustrative prior art circuit arrangement for use in IoT tags.

FIG. 1 shows an illustrative prior art circuit arrangement 100 for use in wireless tags, e.g., IoT tags, but whose oscillator's function is impacted by the voltage drop of its energy store. The circuit includes a storage capacitor 101 for energy storage, voltage reference generation circuit 103, regulator 105, oscillator 107, other reference voltages generator 109, and energy harvester 111.

Energy harvester 111 harvests energy from the environment, as noted above. In one illustrative embodiment, energy harvester 111 harvests energy from electromagnetic energy such as radio frequency (RF) signals. The harvested energy is stored in storage capacitor 101, which supplies energy for operation of other components of the system.

Reference voltage generation circuit 103 develops a voltage reference Vref that is supplied to regulator 105 which develops therefrom a regulated voltage that is supplied to control the frequency of output of oscillator 107. Oscillator 107 may use the regulated oscillator supply voltage as the control for the reference frequency Fosc that it supplies as an output. Oscillator 107 may also receive any other reference voltages that it needs to develop and output the reference frequency Fosc from other reference voltages generator 109. Other reference voltages generator 109 is powered from storage capacitor 101.

In the manner shown in FIG. 1, voltage reference generation circuit 103 is placed to be utilized by regulator 105 on a continuing basis in order to regulate the voltage supplied to oscillator 107. Oscillator 107 may begin to operate to generate its output once the voltage on storage capacitor 101 reaches a designated operating voltage, e.g. "Vstart". The oscillator should be of such a design, as is well known in the art, to have low power consumption and therefore allows the oscillator to be used in a wireless tag that employs harvesting incident energy. In various embodiments the oscillator may be, for example, a ring oscillator, a relaxation oscillator, or an inductor capacitor (LC)-based oscillator.

Figure 2:
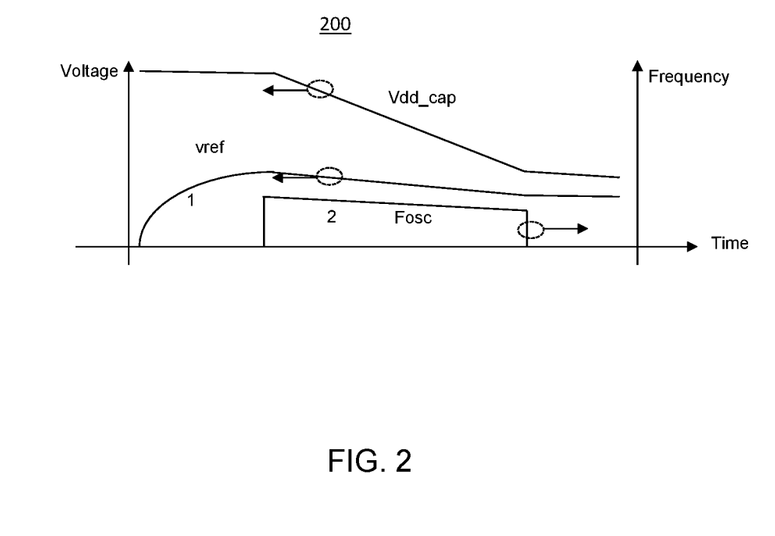
FIG. 2 is an illustrative graph showing various voltages produced by the prior art arrangement of FIG. 1 and the frequency supplied as an output by the oscillator of FIG. 1 as a function of time.

FIG. 2 is an illustrative graph 200 showing various voltages produced by prior art arrangement 100 (FIG. 1) and the frequency Fosc supplied as an output by oscillator 107 as a function of time. The changes in voltage supplied by storage capacitor 101 (Vdd_cap) and the reference voltage (Vref) supplied as an output by reference voltage generator 103 with respect to the passage of time is shown. As can be seen in the graph, as the output voltage of regulator 105, Vref, changes over time it causes a frequency drift of the reference frequency Fosc supplied as an output by oscillator 107.

In accordance with the principles of this disclosure, the oscillation frequency drift is mitigated against by using reference sampling. Such reference sampling may be performed in an embodiment by charging a capacitor that is coupled to a reference voltage generation circuit and then employing the voltage of the capacitor as the reference voltage. Furthermore, the capacitor may be disconnected from the reference voltage and the voltage that is stored on the capacitor is solely used as the reference for the reference voltage generation circuit. The input of the reference voltage generation circuit may have a high impedance so that the voltage stored on the capacitor is not bled off to supply input current to the regulator and therefore the stored voltage remains substantially faithful to the voltage placed on the capacitor.

In an embodiment, the reference voltage generation circuit may be turned off after its output voltage is sampled and stored on the capacitor. Doing so saves power that would otherwise be consumed by the reference voltage generation circuit continually generating the voltage reference and the saved power may be employed elsewhere, e.g., to improve the settling time and thermal noise emission of various circuits. Advantageously, by sampling the reference and using the sampled voltage that is stored on the capacitor, the exposure of reference voltage to low frequency noise is reduced as the time required to place the sampled voltage on the capacitor is much shorter than time over which the oscillator is to operate.

Figure 3:
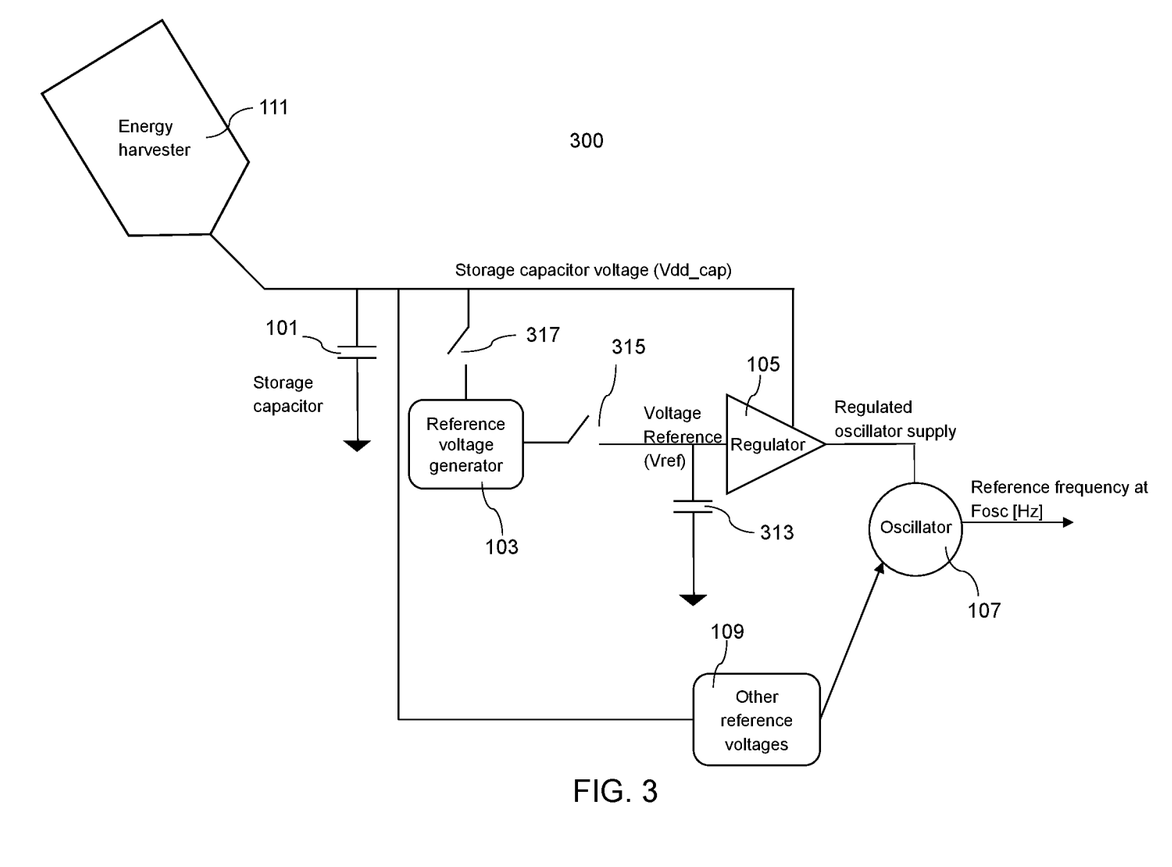
FIG. 3 shows an illustrative circuit arrangement for use in IoT tags but in which the impact of the voltage drop of its energy store on its oscillator's function is minimized, in accordance with the principles of the disclosure.

FIG. 3 shows an illustrative circuit arrangement 300 for use in wireless tags, e.g., IoT tags, but in which the impact of the voltage drop of its energy store on its oscillator's function, i.e., the frequency output thereby, is minimized in accordance with the principles of the disclosure. A wireless tag employing circuit arrangement 300 may be a battery-less tag. that employs an energy harvester. In addition to the components shown in FIG. 1, FIG. 3 includes voltage sample capacitor 313, sampling switch 315, and optional reference voltage generator controller switch 317.

Upon initially powering up, e.g., when energy harvester 111 stores enough energy into storage capacitor 101 so that operation of the IoT tag may begin, sampling switch 315, and optional reference voltage generator controller switch 317, if implemented, are both closed. If optional reference voltage generator controller switch 317 is not implemented, then voltage reference generation circuit 103 is directly connected to storage capacitor 101 as in FIG. 1. As a result, power is supplied from storage capacitor 101 via closed switch 317 to voltage reference generation circuit 103. Voltage reference generation circuit 103 in turn develops the reference voltage and supplies it as an output, via closed switch 315, to both sample capacitor 313 and regulator 105. This allows regulator 105 to begin operating based on the voltage supplied to it from voltage reference generation circuit 103. As the reference voltage settles to its target value, sample capacitor 313 is charged.

Once sample capacitor 313 is fully charged, e.g., the voltage across it reaches that of voltage reference Vref, switch 315 is opened. This results in voltage reference generation circuit 103 being disconnected from regulator 105 and sample capacitor 313. As such, regulator 105 uses the voltage supplied thereto from sample capacitor 313 as the voltage reference Vref on which it bases its production of the regulated oscillator supply voltage that is supplied to oscillator 107. Advantageously, this prevents the sampled voltage reference Vref supplied to regulator 105 from drifting, i.e., changing, as a result of drifting of the supply voltage, i.e., the voltage supplied by storage capacitor 101, as explained in connection with FIG. 2.

The method of determining when to open switch 315 is at the discretion of the implementer. However, as will be readily recognized by those of ordinary skill in the art, the voltage stored on sample capacitor 313 is dependent on the amount of time that it is coupled to reference voltage generator 103 as well as the input current required by regulator 105. In one embodiment, a predetermined amount of time may be waited with the understanding that after such time period that sample capacitor 313 is likely to be fully charged, i.e., the voltage across sample capacitor 313 will be equal to voltage reference Vref. In another embodiment, a measurement of Vref may be made to ascertain that sample capacitor 313 is fully charged. In any case, the time during which sample capacitor 313 is charged may be considered a first time period, e.g., a charging period.

As indicated hereinabove, reference voltage generation circuit 103 may be turned off after its output voltage Vref is stored on sample capacitor 313 and switch 315 is opened, i.e., its output voltage has been sampled. To this end, optional switch 317 is opened. This condition may continue for a second time period. Advantageously, doing so saves power that would otherwise be consumed by operation of reference voltage generation circuit 103.

In view of this, and further advantageously, reference voltage generation circuit 103 may be of a type that consumes more power but has a shorter settling time, i.e., more power is consumed but it achieves the generation of Vref more quickly. This provides the advantage of allowing regulator 105 to become operational more quickly than with a low power version of reference voltage generator 103 but which takes longer to provide the proper value as output Vref. Since when regulator 105 accurately provides Vref determines when oscillator 107 will begin accurately producing its reference frequency as an output, having a shorter settling time for reference voltage generator 103 allows oscillator 107 to begin accurately producing its reference frequency as an output more quickly. However, given that Vref is sampled, i.e., stored on sampling capacitor 313, which is then used to supply Vref to regulator 105, and that thereafter reference voltage generator 103 is turned off, advantageously, overall power usage is still reduced while faster operation is provided for.

Although sampling switch 315, and reference voltage generator controller switch 317 are shown as generic controllable switches, e.g., a type of relay, the implementation thereof is at the discretion of the implementer. As is well known in the art, such switches may be implemented as nmos, pmos, a combination thereof, as well as other known switching technologies. The particular switch type chosen may also depend on the voltages being passed by the switches, e.g., the value of voltage reference Vref. In this regard, for IoT tags, some form of transistor implemented switch, and in particular a low power implementation of such a switch, may be utilized, as is well known to those of ordinary skill in the art.

The positions of switches 315 and 317 may be set under control of a control circuit, not shown in FIG. 3. Such a control circuit may be implemented as a discrete logic, a microcontroller in conjunction with firmware or software, e.g., the microcontroller operating an IoT tag, and a combination thereof.

Figure 4:
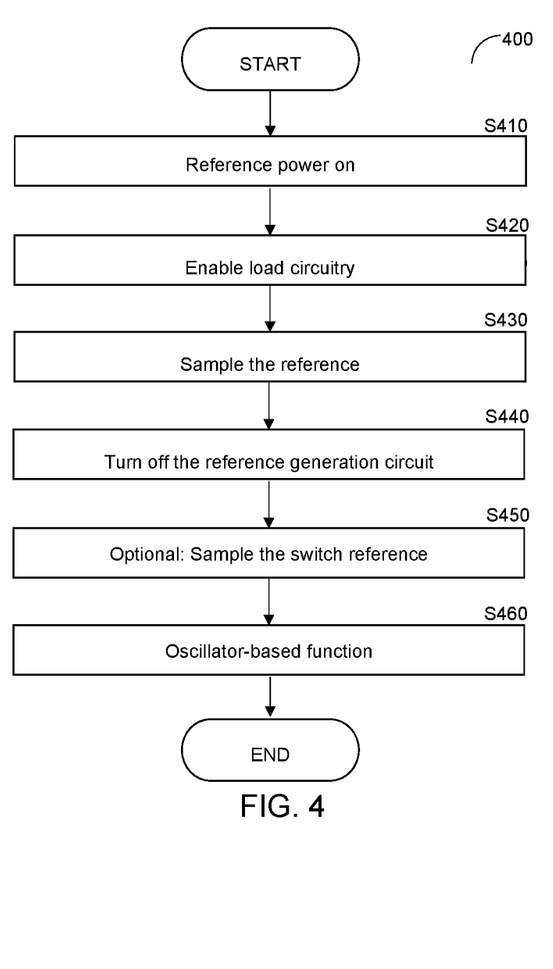
FIG. 4 shows a flowchart of an illustrative method for use in carrying out sampling of a reference voltage signal and using the sampled voltage as a reference according to an embodiment.

FIG. 4 shows a flowchart 400 of an illustrative method for use in carrying out sampling of a reference voltage signal and using the sampled voltage as a reference according to an embodiment. As noted above, by using reference sampling, the performance of the system with respect to power consumption and time to achieve operation due to reduced settling time is improved.

At S410, the reference, e.g., reference voltage generator 103 (FIG. 3) is powered on, e.g., by closing switch 317. At S420, the load circuitry, i.e., anything that may affect the voltage that is sampled onto, i.e., stored in, sampling capacitor 313, is enable, i.e., turned on. Typically this load circuitry is subsequent to, i.e., connected after, sampling capacitor 313 in the circuit chain, e.g., regulator 105 (FIG. 3) and perhaps oscillator 107 (FIG. 3), as well as possibly other circuitry of the tag. This is done to prevent enablement of the load circuitry from influencing the sampled voltage or from changing the sampled voltage stored on sampling capacitor 313 by injecting charge thereto.

At S430, the reference voltage is sampled. In one embodiment, this is performed by opening a switch, e.g., switch 315 (FIG. 3), that disconnects and prevents any current flow from reference voltage generator 103 into sample capacitor 313 and leaving only sample capacitor 313 to supply the voltage stored thereon as the voltage reference to be used by regulator 105. At optional S440, the reference generation circuit is turned off, e.g., in FIG. 3 voltage reference generation circuit 103 is disconnected from storage capacitor 101 by opening switch 317.

At S450, an optional step of sampling the switch control voltage is performed so that sample switch 315 is not subject to fluctuations of the voltage supplied by storage capacitor 101. This may be implemented in an illustrative circuit arrangement 600 shown in FIG. 6 for use in IoT tags but in which the impact of the voltage drop of its energy store on its oscillator's function, i.e., the frequency output thereby, is further minimized in accordance with the principles of the disclosure.

Figure 6:
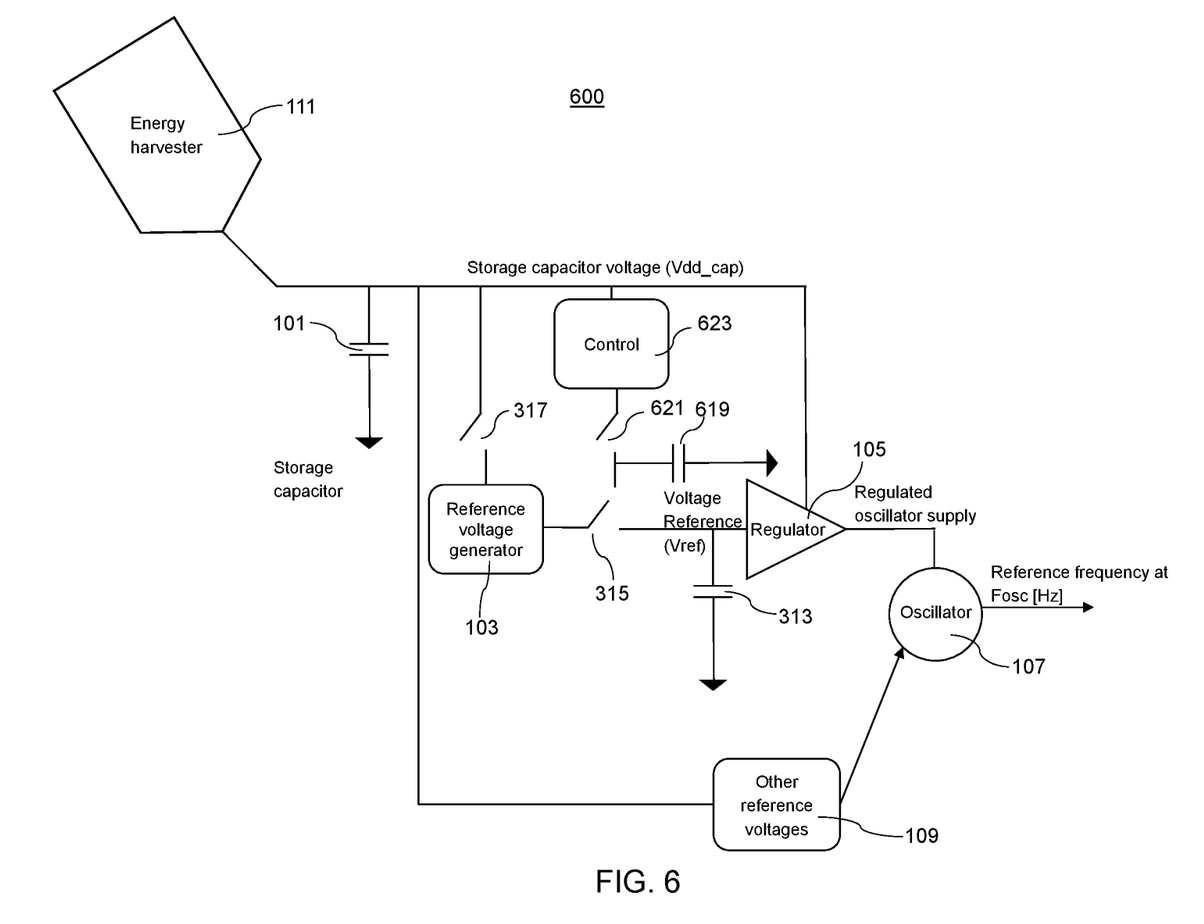
FIG. 6 shows an arrangement for use in IoT tags in which the impact of the voltage drop of its energy store on its oscillator's function is further minimized, in accordance with the principles of the disclosure.

In addition to the components shown in FIG. 3, FIG. 6 includes voltage sample control capacitor 619, control sampling switch 621, and control circuitry 623. As is well known in the art, control sampling switch 621 may be implemented as nmos, pmos, a combination thereof, as well as other known switching technologies. Control circuitry 623 may be any circuitry that implements the functionality described herein. Such may include discrete logic, a microcontroller in conjunction with firmware or software, e.g., the microcontroller operating an IoT tag, and a combination thereof. In some embodiments of the arrangement of FIG. 6, control circuitry 623 may also provide for the control of the positions of switch 317. Some embodiments of the arrangement of FIG. 3 may incorporate control circuitry similar to control circuitry 623 to control of the positions of switches 315 and 317.

Control sampling switch 621 controls the supplying of a signal, e.g., a voltage, to the control point of sample switch 315. The control point of sample switch 315 is the point that is used to control whether sample switch 313 is open or closed. In the embodiment of FIG. 3, as noted above, this signal is provided by a processing circuit, e.g., directly. However, in the embodiment of FIG. 6, the processing circuit effectively directly controls the position of control sampling switch 621 and thereby may indirectly control the position of sample switch 315.

To this end, when control sampling switch 621 is closed, it supplies a voltage, e.g., from control circuitry 623, which is in turn coupled to storage capacitor 101, to close sample switch 315. This voltage also may be stored, e.g., sampled, in sample control capacitor 619, which charges as a result of the closing of control sampling switch 621. After sample control capacitor 619 is charged to the proper reference level, e.g., after a prescribed time period, which may be determined applying the same principles as discussed hereinabove with regard to the charging of sample capacitor 313, control sampling switch 621 may be opened so that the voltage at sample control capacitor 619 then controls the position of sampling switch 315. This provides better stability for the voltage at the control point of sample switch 315 when the voltage supplied by storage capacitor 101 drops. In other words, advantageously, notwithstanding any voltage drop that may occur at storage capacitor 101 as time goes on, and which may be propagated to control 623 and would thereby affect its output voltage, the voltage supplied by sample control capacitor 619 holds better and thus is better able to control the position sampling switch 315.

The voltage on sample control capacitor 619 may discharge passively via leakage currents or it may be actively discharged by again closing control sampling switch 621 but having control circuitry 623 supply to sampling switch 621 a voltage that will drain off the charge stored in sample control capacitor 619 that was responsible for the voltage that it was supplying to keep sample switch 315 open.

At S460, the oscillator generates the reference frequency. S460 may be started and performed at any point after S420, e.g., if the oscillator is part of the load circuitry as discussed above.

In an embodiment, advantageously, the sampling of voltage reference Vref, i.e., effectively storing its value on sampling capacitor 313, allows a low-power oscillator to operate during periods of time when storage capacitor 101 is being charged, e.g., earlier in the process such as during a period when the tag is being booted or later in the process when most of the tag is powered down and just retaining its prior information. To this end, as will be well understood by those of ordinary skill in the art, the relationship between sample capacitor 313 and the input to regulator 105 must be such that the voltage on sample capacitor 313 remains sufficiently accurate between the times that sample capacitor 313 is charged.

Figure 5:
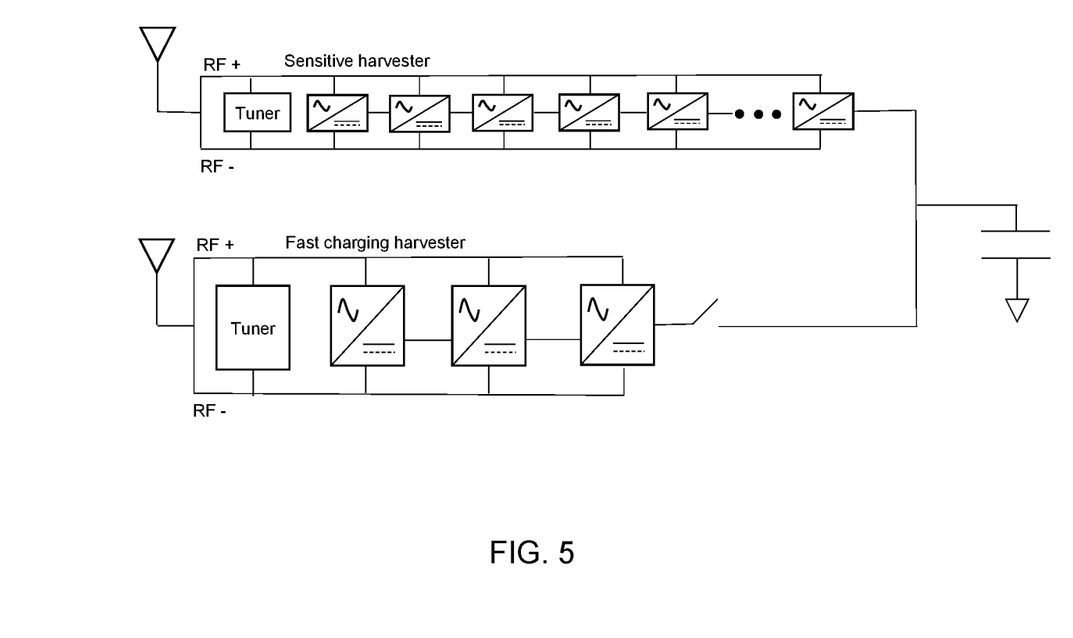
FIG. 5 shows a schematic circuit diagram of an energy harvesting system with two harvesters according to an embodiment.

FIG. 5 shows a schematic circuit diagram of an energy harvesting system with two harvesters according to an embodiment. In an embodiment, the maximum power-point tracking (MPPT) is carried out with two harvesters. One harvester is configured as a sensitive but slower-to-charge harvester which includes a long chain of small units of rectifiers that enables to work with minimum input power. Another harvester is configured as a fast-charging harvester that is less sensitive. This harvester is composed of short chain of wider units of rectifiers, delivering higher amount of current to the output capacitor.

In an embodiment, the harvester is coupled to separate antennas. The initial harvesting is done by the sensitive harvester that enables the system to operate from longer ranges. At this point, the fast-charging harvester is not connected. After the initial harvesting, the fast-charging harvester is connected to the output capacitor and a self harvester tuning is performed based on charge speed (similar to the harvester frequency tuning). In order to avoid interference of the sensitive harvester during the operation of the fast-charging harvester, the sensitive harvester is shifted from the operating frequency by the self tuner first power on and is disconnected at its DC output. In this embedment, self tuner changes the operation frequency range of the harvester. For example, the harvester harvests ambient signals at a specific frequency range, then the harvester is tuned to effectively harvest energy at a different specific frequency range depending on its need. With this design of the embodiment to switch the harvester on or off, difficulties of antenna coupling and DC current leakage may be removed. In a further embodiment, the energy harvesting system may include more than the two harvesters presented in the figure.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. Apparatus for providing a regulated power supply to an oscillator, comprising:
   a reference voltage generator, the reference voltage generator supplying a voltage reference as an output;
   a regulator that produces a regulated supply as a function of a voltage received as an input thereto, the regulated supply being provided as an output for use by the oscillator which bases a frequency it produces and supplies as an output on the regulated supply;
   a sample capacitor having a terminal thereof coupled to the regulator; and
   a controllable switch, the controllable switch being coupled to the reference voltage generator and being coupled to a point at which the sample capacitor terminal is coupled to the regulator, wherein when the controllable switch is in a closed position the controllable switch electrically couples the reference voltage generator to the regulator and to the sample capacitor terminal so that the regulator and sample capacitor each receive the voltage reference supplied as an output by the reference voltage generator and when the controllable switch is in an open position the regulator and sample capacitor are both disconnected from the reference voltage generator;
   wherein, the controllable switch is closed for at least one time period, wherein during the at least one time period a voltage is stored on the sample capacitor, the voltage stored on the sample capacitor being based on the voltage reference supplied as an output by the reference voltage generator, and for at least a second time period that is subsequent to the first time period the controllable switch is in the open position, and voltage stored on the sample capacitor is supplied from the sample capacitor terminal to the regulator for use as the voltage received as an input thereto.

2. The apparatus of claim 1, further comprising a storage capacitor for powering the reference voltage generator and the regulator.

3. The apparatus of claim 2, further comprising an energy harvester that supplies harvested energy for storage in the storage capacitor.

4. The apparatus of claim 2, further comprising a second controllable switch, the second controllable switch in a closed position coupling energy from the storage capacitor to the reference voltage generator and disconnecting the reference voltage generator from the storage capacitor in an open position, the second controllable switch being in the closed position during the first time period and being in the open position during at least a portion of the second time period, whereby the reference voltage generator ceases to operate during the at least a portion of the second time period.

5. The apparatus of claim 1, wherein the second time period begins substantially immediately upon conclusion of the first time period.

6. The apparatus of claim 1, further comprising a second controllable switch, the second controllable switch having one terminal coupled to a control circuit coupled to the storage capacitor and one terminal coupled to both the sample control capacitor and a terminal of the controllable switch that controls whether the controllable switch is open or closed, so that when the second controllable switch is closed, the sample control capacitor is charged and power from the control circuit controls the state of the controllable switch and, when the second controllable switch is open, power from the sample control capacitor controls the state of the controllable switch, and for at least part of the second time period the second controllable switch is open.

7. The apparatus of claim 1, wherein the regulator is coupled to the capacitor terminal and controllable switch at a high impedance input.

8. The apparatus of claim 1, further comprising the oscillator, the oscillator receiving the regulated supply as an input and producing and supplying as its output the frequency.

9. A wireless tag comprising the apparatus of claim 1.

10. The wireless tag of claim 9, wherein the wireless tag is an Internet of Things (IoT) tag.

11. The wireless tag of claim 9, wherein the wireless tag is a battery-less tag.

12. A method for use in a system for providing a regulated power supply to an oscillator of a wireless tag, the wireless tag comprising:
a reference voltage generator, the reference voltage generator supplying a voltage reference as an output;
a regulator that produces a regulated supply as a function of a voltage received as an input thereto, the regulated supply being provided as an output for use by the oscillator which bases a frequency it produces and supplies as an output on the regulated supply;
a sample capacitor having a terminal thereof coupled to the regulator; and
a controllable switch, the controllable switch being coupled to the reference voltage generator and being coupled to a point at which the sample capacitor terminal is coupled to the regulator, wherein when the controllable switch is in a closed position the controllable switch electrically couples the reference voltage generator to the regulator and to the sample capacitor terminal so that the regulator and sample capacitor each receive the voltage reference supplied as an output by the reference voltage generator and when the controllable switch is in an open position the regulator and sample capacitor are both disconnected from the reference voltage generator;

the method comprising:
powering on the reference generator;
powering on load circuitry, the load circuitry being circuitry whose operation is dependent as a function of the voltage reference;
storing a voltage having substantially the same voltage value as the reference voltage on the sample capacitor by closing the controllable switch; and
opening the controllable switch, whereby the point at which the sample capacitor terminal is coupled to the regulator is disconnected from the reference voltage generator.

13. The method of claim 12, wherein the controllable switch is closed prior to the sampling of the reference voltage.

14. The method of claim 12, wherein a control voltage is employed to control the position of the controllable switch, the method further comprising:
storing a voltage that equals the control voltage on a sample control capacitor; and
disconnecting the sample control capacitor and the controllable switch from a source providing the control voltage.

15. The method of claim 12, further comprising generating an oscillating signal by the oscillator based on the voltage stored on the capacitor.

16. The method of claim 12, wherein while storing the voltage having substantially the same voltage value as the reference voltage on the sample capacitor the reference voltage is also supplied to the regulator.

17. The method of claim 12, wherein the controllable switch is opened when the reference voltage is substantially stored on the sample capacitor.

18. The method of claim 12, wherein the controllable switch is closed for a first time period during which the storing takes place and the controllable switch is open for a second time period, that is subsequent to the first time period, during which the sample capacitor terminal is coupled to the regulator is disconnected from the reference voltage generator.

19. The method of claim 12, further comprising turning off the reference generator.

20. The method of claim 19, wherein the reference generator is turned off by opening a switch connecting the reference generator to a power source that stores power from an energy harvester.

* * * * *